United States Patent [19]

Uhrner

[11] 4,278,218
[45] Jul. 14, 1981

[54] SEAL

[75] Inventor: Klaus-Jürgen Uhrner, Leingarten, Fed. Rep. of Germany

[73] Assignee: KACO GmbH & Co., Heilbronn, Fed. Rep. of Germany

[21] Appl. No.: 154,530

[22] Filed: May 29, 1980

[30] Foreign Application Priority Data

May 29, 1979 [DE] Fed. Rep. of Germany ....... 2921669

[51] Int. Cl.³ .............................................. F16J 15/34
[52] U.S. Cl. ......................................... 277/40; 277/88
[58] Field of Search ........................ 277/37, 38, 39, 40, 277/41, 42, 88

[56] References Cited

U.S. PATENT DOCUMENTS

| 3,764,148 | 10/1973 | Mullaney | 277/40 |
| 4,063,741 | 12/1977 | Kerr | 277/40 |

FOREIGN PATENT DOCUMENTS

| 602681 | 8/1960 | Canada | 277/40 |
| 2732658 | 7/1978 | Fed. Rep. of Germany | 277/38 |

Primary Examiner—Robert I. Smith
Attorney, Agent, or Firm—Becker & Becker, Inc.

[57] ABSTRACT

A seal, especially for dishwashers, for sealing a shaft. The seal comprises a bellows made of elastic material, with a support housing and a slide ring associated therewith. The bellows at least partially overlaps the slide ring and the support housing. An inner side of the outer wall of the bellows engages an axially parallel peripheral wall of the support housing. The seal also comprises a pressure spring which operates between the support housing and the slide ring. The peripheral wall of the support housing, and the inner side of the outer wall of the bellows, have such a profiling that support surfaces are arranged on the peripheral wall transverse to the force of the pressure spring, and that corresponding countersurfaces are arranged on the outer wall, the support surfaces and countersurfaces being arranged in axial sequence. The profiling of the peripheral wall of the support housing and the outer wall of the bellows is preferably step-like or serrated, and extends transverse to the axial direction of the seal.

20 Claims, 4 Drawing Figures

SEAL

The present invention relates to a seal, particularly for dishwashers, for sealing a shaft. The seal includes a bellows made of elastic material, with a support housing and a slide ring associated therewith. The bellows at least partially overlaps the slide ring and the support housing. An inner side of the outer wall of the bellows engages the axially parallel circumferential wall of the support housing. The seal also includes a pressure spring which operates between the support housing and the slide ring.

With such seals, it is known to connect the slide ring by means of a press fit with the bellows so that it is secured against rotation and is sealed against a medium. To produce the press fit, a metal housing is vulcanized into the axially movable bellows end. The support housing necessary for producing the press fit in the receiving bore of the unit can, for technical production or finishing reasons, only be tied or fixed into that axially stationary end of the bellows turned away from the slide ring.

With the previously known embodiments, there exists the danger that the bellows, during installation or pressing-in of the seal into the unit, shifts from the support housing counter to the direction of installation.

To reduce the danger of shifting from the support housing, the bellows must radially inwardly surround the support housing to a great extent. Consequently, a correspondingly large undercutting occurs at the bellows. This undercutting in turn creates a very stong expansion loading of the bellows material during deformatiaon of the bellows and during fixing of the support housing in the bellows; such expansion loading can lead to damaging of the bellows. The size of the undercutting accordingly cannot be arbitrarily selected.

The problem of shifting of the bellows from the support housing is not resolved with sufficient certainty even with great undercutting at the bellows. The assembly of such seals must therefore be carried out in an extemely careful manner and with special tools, which can lead to difficulties, particularly with eventual service work.

Accordingly, the object of the present invention is to improve a seal of the aforementioned type in such a way that a positive connection is attained between the bellows and the seal housing, and shifting of the bellows from the support housing counter to the direction of installation is precluded with certainty during installation of the seal into the unit.

This object, and other objects and advantages of the present invention, will appear more clearly from the following specification in connection with the accompanying drawings, in which.

Figure 1:
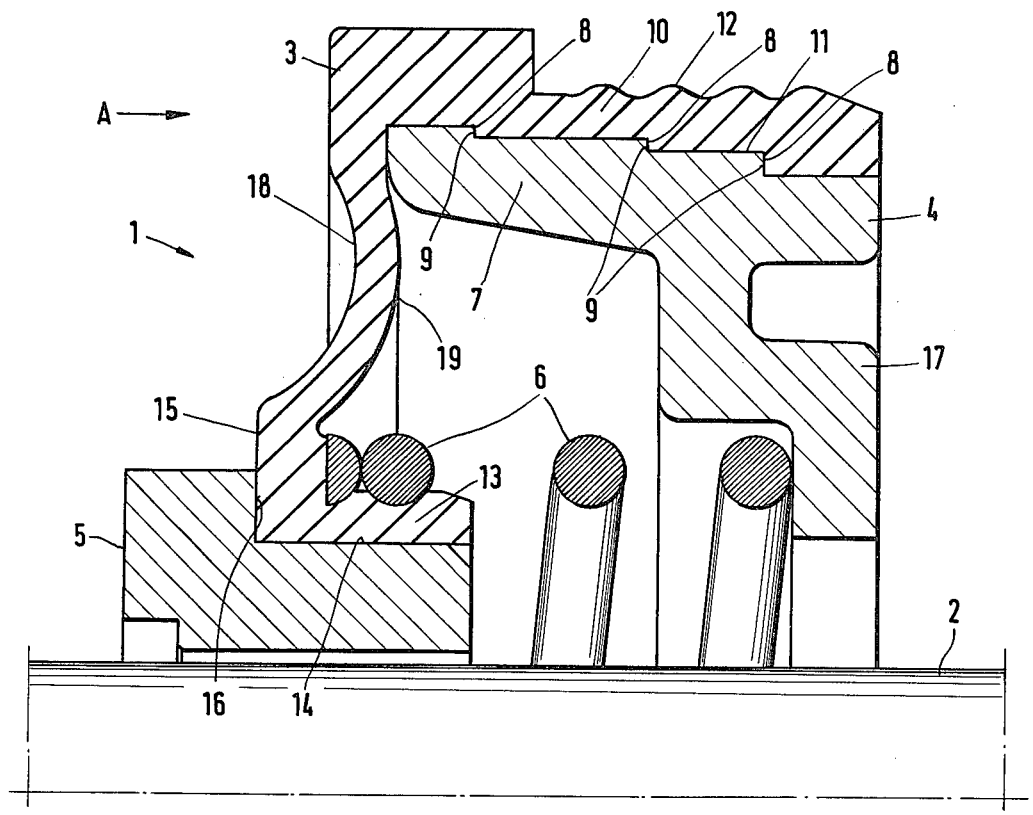
FIG. 1 is a section taken through a portion of a seal in accordance with the present invention.

The seal of the present invention is characterized primarily in that the circumferential wall of the support housing, and the inner side of the outer wall of the bellows, have such a profiling that support surfaces are arranged on the circumferential wall transverse to the force of the pressure spring, and that corresponding countersurfaces are arranged on the outer wall, the support surfaces and countersurfaces being arranged in axial sequence.

A snap or detent connection is provided by the profiling of the support surfaces arranged along the circumferential wall of the support housing, against which the countersurfaces of the bellows come into engagement. This snap connection reliably withstands the axial forces that arise, whereby the outer wall of the bellows is fixed on the support housing against movement counter to the direction of pressing-in; during pressing-in of the seal into the unit, the outer wall of the bellows cannot be shifted from the circumferential wall, which makes possible a quick and problemless carrying out of the work, particularly with eventual service work. A further advantage consists in that a number of supports or abutments are available for the positive connection as a result of the sequential arrangement of the support and counter surfaces, so that a distribution for absorbing force is provided, as a result of which the individual support surfaces and countersurfaces can have a small radial height. Such a low profiling in the radial direction has the advantage that the undercut on the bellows is small, so that the production of the seal is simpler and easier, because an easy deformation of the bellows as well as assembly of the support housing in the bellows is attained without great expansion of the bellows, whereby the countersurfaces of the outer wall snap behind the support surfaces when pushed onto the support housing. The inventive embodiment of the profiling has the further advantage that it can be produced by non-cutting working procedures. Consequently, it is possible to use economical support housings of thermoplastic material produced in injection molding or injection diecasting processes.

Further advantageous and expedient features of the inventive seal are as follows. The profiling on the peripheral wall of the support housing and the outer wall of the bellows may be arranged mirror symmetrical with respect to a plane directed transverse to the axis, and is preferably embodied stepwise or serrated. The outer wall of the bellows may have a wavy or corrugated profile on the outer side which extends essentially parallel to the inner surface. The bellows may have a support wall which overlaps the slide ring and extends substantially parallel to the outer wall with the free end extending toward the support housing; the pressure spring overlaps the support wall; and preferably the bellows, proceeding from the support wall, itself preferably arranged in a recess of the slide ring, is provided with a pressure surface extending at right angles to the support wall and arranged along a radial abutment or counterbearing surface of the slide ring. The spring may be embodied axially cylindrically and arranged parallel to the support wall of the bellows.

The bellows may have an essentially curved membrane portion between the slide ring side support wall and the support housing side outer wall; this membrane wall portion preferably has a vulcanized bulge or curvature; a wedge piece is preferably arranged in the bellows between the pressure spring and the support wall, and has at least one cam which is arranged in a groove of the support housing. The support wall of the bellows may have a recess in which a nose or projection of the wedge piece can be placed. The wedge piece may have a serration or toothing which is preferably arranged on a radially resilient lip of the wedge piece.

The support wall of the bellows may have an extension, with the free end of the pressure spring side of the end wall of the support housing engaging the support wall.

The support housing may have a recess or cavity provided near the free end region of the bellows, with a radially resilient wall portion being arranged on the circumferential or peripheral wall between the recess or cavity and the outer wall of the bellows; preferably, the bellows has a hook portion on the free end region of the outer wall which can be arranged in the recess or cavity.

The support housing may be made of thermoplastic material produced by injection molding or in an injection die-casting operation. The membrane portion, in unstressed condition, has such a height that the membrane is undeformed relative to its starting production height with the slide ring installed in the unit when the size of the installation length in the unit is accurate.

Referring now to the drawings in detail, the seal 1 illustrated in FIG. 1 is provided for sealing a shaft 2 of a dishwasher, and comprises a bellows 3 made of rubber-elastic material, a support housing 4, a slide or slip ring 5, and a pressure spring 6. The circumferential wall 7 of the support housing 4 has radially extending or directed support surfaces 8 against which countersurfaces 9 engage which are embodied on the bellows 3 along the inner side of the outer mantel or wall 10 thereof. The support surfaces 8 and the countersurfaces 9 are arranged sequentially in the axial direction at different diameters, so that a step-like profiling 11 is formed which is embodied as an easy-to-handle snap connection capable of being released at any time, whereby the step with the respectively largest diameter lies upon that side of the support housing axially opposed to the press-in direction A, consequently assuring a secure holding of the bellows 3 on the support housing 4. The outer side of the outer mantel or wall 10 is embodied as a wavy or corrugated profile 12, by means of which a reliable, medium-sealing press fit of the seal 1 is attained in the unit, even with relatively large diameter tolerances of the receiving bore, as required with pump housings produced in an injection molding or injection die-casting process.

That portion of the bellows 3 on the side of the slide ring 5 has a support wall 13 which extends parallel to the outer wall 10, with the free end thereof being directed toward the support housing 4. The support wall 13 is arranged in a recess 14 of the slide ring 5, whereby a pressure surface 15, which projects at right angles from the support wall 13, engages a radial abutment surface 16 of the slide ring 5, by way of which abutment surface the force of the pressure spring 6 is conducted to the slide ring 5. The pressure spring 6 is embodied as a cylindrical coil spring, with one end thereof engaging an end wall 17 of the support housing 4; the pressure spring is arranged parallel to the support wall 13, which it overlaps, whereby with an assembled slide ring 5, the outer diameter of the support wall 13 is greater than the inner diameter of the pressure spring 6, so that the support wall is pressed radially inwardly on the recess 14 of the slide ring 5 so as to be medium-sealing and also fixed against rotation.

Between the support wall 13 of the slide ring side, and the outer wall 10, the bellows 3 has an essentially curved membrane portion 18, which is embodied in the form of a plate spring. During its production, the membrane 18 receives such an unstressed height that, with the slide ring seal installed in the unit, the membrane 18 is not deformed relative to its height when the size of the installation length in the unit is accurate.

With greater tolerance of the installation length in the unit or assembly, the membrane 18 is provided with a bulge or curvature 19, which is directed toward the support housing, for enlarging the spring path of the membrane. This bulge or curvature 19 makes possible a rolling-off movement of the membrane wall 18 during axial movement of the slide ring 5.

As a consequence of the fact that in the membrane portion 18, with an accurate size of the installation length in the unit, no reset or return force is generated, the axial force effective upon the slide ring 5 is furnished only by the pressure spring 6, and can accordingly be kept in considerably closer tolerances; additionally, the axial force is only subjected to slight changes during the installation time of the seal since the force of the pressure spring (in contrast to the reset or return force of the rubber membrane 18) is not changed by the influence of medium or temperature during the operation of the seal.

Figure 2:
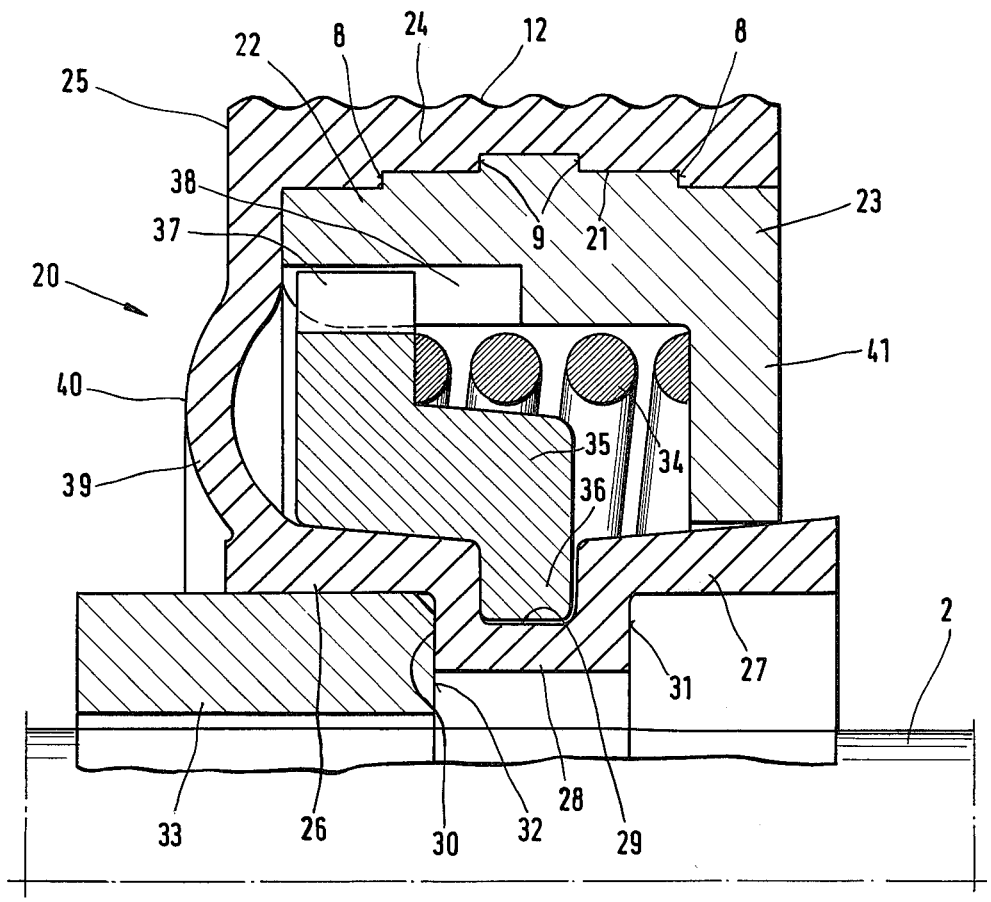
FIG. 2 illustrates in section another embodiment of a seal in accordance with the present invention.
Figure 3:
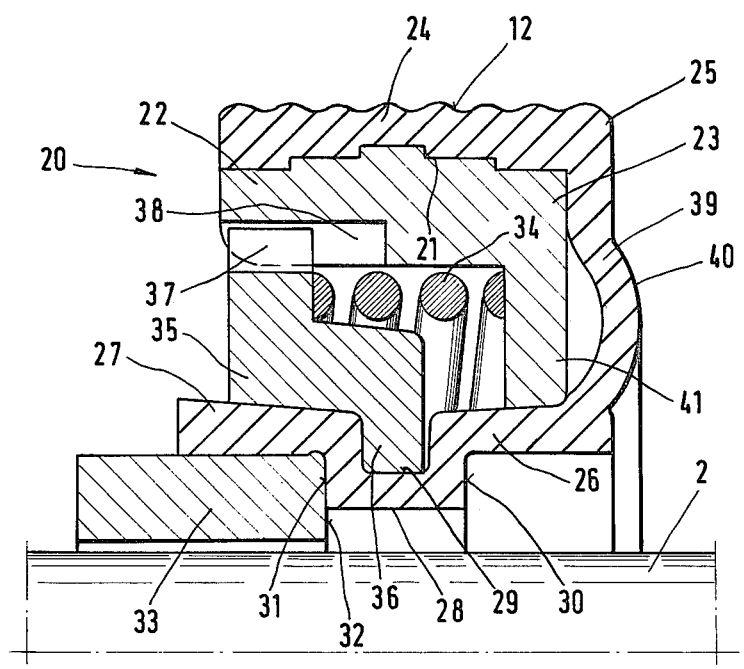
FIG. 3 shows the seal according to FIG. 2, though with the bellows turned by 180°.

With the seal 20 illustrated in FIGS. 2 and 3, the likewise step-like profiling 21 on the peripheral or circumferential wall 22 of the support housing 23, and on the outer mantle or wall 24 of the bellows 25, has mirror or specular symmetry as to an axially transverse plane. The support wall 26, which extends parallel to the peripheral wall 22, has an extension 27, and likewise has mirror or specular symmetry with respect to the aforementioned axially transverse plane. The support wall 26, in the longitudinal middle, has a U-shaped shoulder or projection 28, so that a recess 29, as well as pressure surfaces 30, 31 for engagement on the abutment or counterbearing surface 32 of the slide ring 33, is formed. A Z-shaped wedge piece 35 is arranged in the bellows 25 between the pressure spring 34 and the support wall 26. This wedge piece 35 is secured against rotation at the one end with a flange 36 in the recess 29, and at the other end with one or more cams 37 in axial grooves 38 of the support housing 23. In FIG. 2, the bellows 25 is arranged in such a way that the membrane wall 39 is directed against the liquid medium with the preformed bulge or curvature 40, and across therefrom, the extension 27 radially engages the inner bore of the pressure spring side of the end wall 41 of the support housing 23, so that the seal 20 practically has a closed inner chamber, in which the pressure spring 34 is shielded against leakage discharging from the seal gap. In FIG. 3 by contrast, the bellows 25 is in a position turned by 180°, so that the seal 20 is open toward the medium. A shifting of the outer wall 24 from the support housing 23 is reliably precluded by the mirror symmetrical profiling 21, independent of whether the seal 20 is installed or pressed forward into the unit with the slide ring 33 or with the end wall 41.

Figure 4:
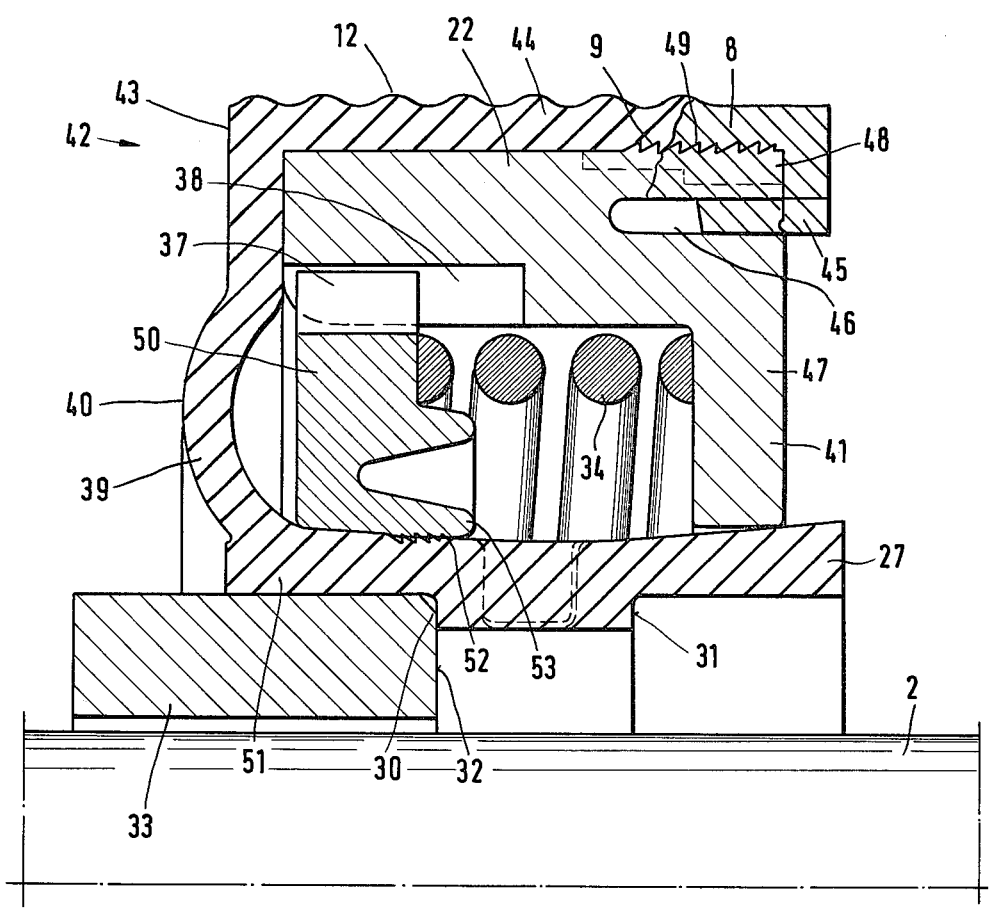
FIG. 4 is a sectional view of a further embodiment of a seal having features in accordance with the present invention.

The seal 42 disclosed in FIG. 4 is essentially identical with the seal in FIG. 2, though the bellows 43, at the free end region of the outer wall 44, has a hook portion 45 which is arranged in a recess 46 of the support housing 47. The wall portion 48 arranged between the outer wall 44 and the recess 46 is resiliently embodied for better deformation in the radial direction, and forms a serrated profiling with the outer wall 44. A toothed section 52 arranged on the wedge piece 50 and on the support wall 51 is likewise serrated, whereby the portion of the serration 52 on the wedge piece is arranged on a radially resilient lip 53.

The present invention is, of course, in no way restricted to the specific disclosure of the specification and drawings, but also encompasses any modifications within the scope of the appended claims.

What I claim is:

1. A seal, especially for dishwashers, for sealing a shaft, said seal comprising:

a slide ring for placement on said shaft;

an elastic bellows adapted to at least partially overlappingly engage said slide ring, said bellows being located substantially radially outwardly of said slide ring, and being provided with a radially outer wall portion extending substantially parallel to said shaft and having a radially outer peripheral surface and a radially inner peripheral surface, said peripheral surfaces extending approximately parallel to one another;

a support housing located radially inwardly of said outer wall portion of said bellows and being provided with a radially outer circumferential wall portion extending substantially parallel to said shaft and having a radially outer peripheral surface which is adapted to be at least partially overlappingly engaged by said inner peripheral surface of said outer wall portion of said bellows; and a pressure spring for operation between said support housing and said slide ring, said outer peripheral surface of said circumferential wall portion of said support housing, and said inner peripheral surface of said outer wall portion of said bellows, having a corresponding profiling, said profiling including support surfaces arranged on said circumferential wall portion transverse to the force of said pressure spring, and corresponding counter-surfaces arranged on said outer wall portion, said support surfaces and said countersurfaces being arranged in axial sequence for engagement with one another.

2. A seal according to claim 1, in which said profiling is mirror symmetrical with respect to a plane directed transverse to the axis of said shaft.

3. A seal according to claim 2, in which said profiling is step-like.

4. A seal according to claim 2, in which said profiling is serrated.

5. A seal according to claim 2, in which said outer peripheral surface of said outer wall portion of said bellows has a wavy profile.

6. A seal according to claim 5, in which said bellows is provided with a support wall which extends substantially parallel to said shaft and to said outer wall portion of said bellows for effecting overlap of said slide ring, that end of said support wall remote from said slide ring being free and extending toward said support housing, and in which said pressure spring overlaps said support wall.

7. A seal according to claim 6, in which said bellows is provided with a pressure surface located in the vicinity of said support wall and extending at right angles thereto, and in which said slide ring is provided with an abutment surface for engagement by said pressure surface.

8. A seal according to claim 7, in which said slide ring is provided with a recess for receiving said support wall of said bellows.

9. A seal according to claim 6, in which said pressure spring is axially cylindrical and is arranged parallel to said support wall of said bellows.

10. A seal according to claim 9, in which said bellows is provided with an essentially curved membrane wall portion located between said support wall and said outer wall portion.

11. A seal according to claim 10, which includes a wedge piece provided within said bellows between said pressure spring and said support wall, said wedge piece having at least one cam, and in which said wall portion of said support housing is provided with at least one groove for receiving said at least one cam.

12. A seal according to claim 11, in which said membrane wall portion has a vulcanized bulge.

13. A seal according to claim 11, in which said wedge piece is provided with a projection, and said support wall of said bellows is provided with a recess to receive said projection.

14. A seal according to claim 11, in which said wedge piece is provided with a serration.

15. A seal according to claim 14, in which said wedge piece is provided with a radially resilient lip, said serration being provided on said lip.

16. A seal according to claim 11, in which said support wall of said bellows includes an extension, and in which that radially inner end of said support housing remote from said peripheral wall thereof engages a portion of said support wall.

17. A seal according to claim 16, in which said support housing is provided with a recess in that portion thereof remote from said membrane wall portion of said bellows, said support housing also including a radially resilient wall portion on said circumferential wall portion thereof between said recess and said outer wall portion of said bellows.

18. A seal according to claim 17, in which that end of said outer wall portion of said bellows remote from said membrane wall portion thereof includes a hook portion receivable in said recess of said support housing.

19. A seal according to claim 1, in which said support housing is an injection molded piece of thermoplastic material.

20. A seal according to claim 10, in which said membrane wall portion, in unstressed condition, has such a height, that it is undeformed relative to its starting production height, with said slide ring installed when the size of the installation length is accurate.

* * * * *